March 13, 1951 W. F. HEROLD 2,544,924
INDUSTRIAL TRUCK CASTER WHEEL
Filed Oct. 4, 1945 4 Sheets-Sheet 1

Inventor
Walter F. Herold
Rockwell & Bartholow
Attorneys

March 13, 1951 — W. F. HEROLD — 2,544,924
INDUSTRIAL TRUCK CASTER WHEEL
Filed Oct. 4, 1945 — 4 Sheets-Sheet 2

Inventor
Walter F. Herold
By Rockwell & Bartholow
Attorneys

March 13, 1951 W. F. HEROLD 2,544,924
INDUSTRIAL TRUCK CASTER WHEEL
Filed Oct. 4, 1945 4 Sheets-Sheet 3

Inventor
Walter F. Herold
By Rockwell & Bartholow
Attorneys

March 13, 1951 W. F. HEROLD 2,544,924
INDUSTRIAL TRUCK CASTER WHEEL
Filed Oct. 4, 1945 4 Sheets-Sheet 4

Inventor
Walter F. Herold
By Rockwell & Bartholow
Attorneys

Patented Mar. 13, 1951

2,544,924

UNITED STATES PATENT OFFICE 2,544,924

INDUSTRIAL TRUCK CASTER WHEEL

Walter F. Herold, Easton, Conn., assignor to The Bassick Company, Bridgeport, Conn., a corporation of Connecticut Application October 4, 1945, Serial No. 620,239

15 Claims. (Cl. 105—170)

1

This invention relates to industrial trucks, and more particularly to wheel mountings for industrial trucks.

In some aspects of the invention the same is directed to a caster structure adapting the truck to use either on a track comprising a pair of upstanding rails or on a planar surface such as a floor, the caster being in general of the type disclosed in my application Serial No. 556,383, filed September 29, 1944, now Patent No. 2,541,514, dated Feb. 13, 1951.

In another aspect the invention is directed to improvements in wheel mountings which are cushioned and of the knee-action variety, the improved mounting being of the general type disclosed in my Patent No. 2,377,232, dated May 29, 1945.

One object of the invention is to provide an improved wheel mounting for a vehicle adapted for rolling support either on a floor or on a guide track.

Another object is to provide a wheel mounting having improved cushioning means for the wheel structure.

Another object is to provide an improved caster embodying two wheels mounted side by side upon the same axle.

In the accompanying drawings:

Fig. 4A is a detail section on line 4A—4A of Fig. 3;

Figure 1:
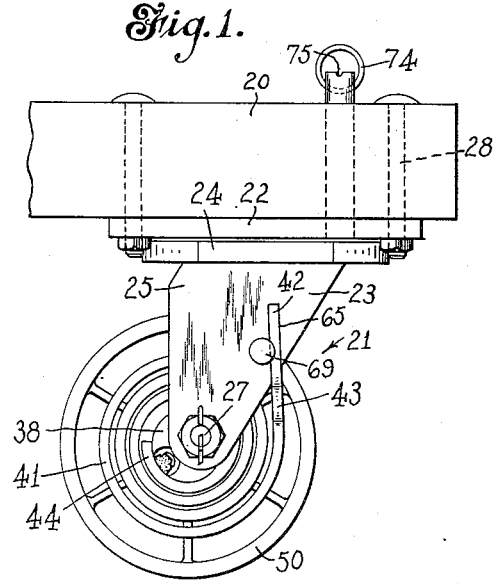
Fig. 1 is a side elevation showing a portion of an industrial truck, said truck having mounted at the under side of the truck body a caster structure constructed in accordance with the invention.

In the drawings, there are shown, as examples only, two forms of caster structure constructed in accordance with the invention. These caster structures are applicable to industrial trucks adapted to be moved from place to place in a factory, and to rolling platforms used in the assembly of parts of structures, for example airplanes, and to like vehicles. Usually the vehicle has a rectangular body to which four or more casters are applied at the under part, and usually the casters are of the swiveling type, but in some cases they will be of the non-swiveling type. The vehicle, for example the industrial truck, is adapted to be used either on a track consisting of a pair of upstanding guide rails, or on a planar surface such as a floor. The vehicle can be used either on the track or on the floor without the need of any change or adjustment being made in the supporting wheel structure. The wheel structure is so made that it presents a guiding groove adapted to engage the guide rail in a manner to guide the vehicle rectilinearly in a precise manner, and the wheel structure also presents a substantially cylindrical tread portion or surface adapted to engage the floor when the vehicle is removed from the track, said surface being of sufficient area to support the truck without injury to the floor. The wheel structure thus constituted is also preferably provided with cushioning means between the axle and the wheel structure providing a cushioned support for the vehicle body. This cushioned mounting has certain marked advantages, one of which is that when the vehicle is moving over a rough floor or over uneven ground, shocks are taken up and the vehicle moved much more smoothly than would otherwise be the case.

In the forms shown in the drawings, the wheel structure consists of two elements rotating about the same axle and located side by side and in close proximity to each other, one of said elements being wider than the other, the wider element having a track-engaging groove substantially in the median line of the wheel structure, and also having a floor-engaging surface at the side thereof remote from the narrow wheel element. The narrow wheel element, on the other hand, has a floor-engaging surface extending substantially over its entire width, this surface being substantially flush with that on the wide wheel element. The arrangement is such that, when the vehicle is track-guided, the wide element only engages the track, whereas, when the vehicle is used on the floor, both elements engage the floor. Preferably each wheel element has a cushioned mounting with respect to the common supporting axle. The cushioned mounting involves preferably two pancake spiral springs of the general type disclosed in my Patent No. 2,377,232, said springs being located adjacent the outer sides of the respective wheel elements, as hereinafter described.

Figure 2:
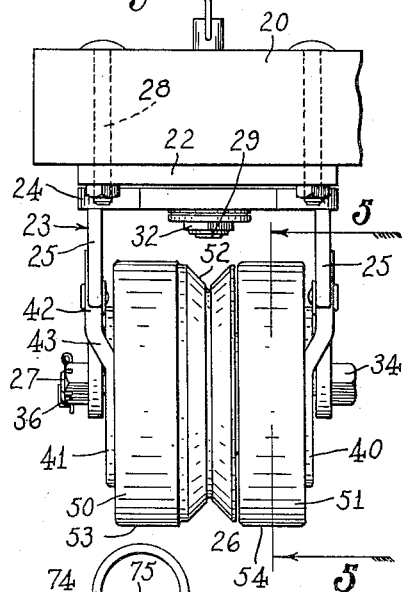
Fig. 2 is a view taken at right angles to Fig. 1.

Referring particularly to Figs. 1 and 2, the body of the vehicle is partially shown at 20, and one of the caster structures applied to the vehicle is indicated in general at 21. The caster structure comprises a top plate 22, a horn 23 having an upper plate 24 and legs 25, and a duplex wheel structure generally indicated at 26. This wheel structure is mounted for rotation upon an axle 27 extending between the terminals of the horn 23.

The top plate 22 of the caster is fastened to the truck body in any appropriate manner, as by means of a plurality of bolts 28. The top plate has fixed to it a downwardly projecting king pin 29 upon which the horn is swiveled. In the form shown, the upper plate or member of the horn has an apertured portion 30 in which is received a roller bearing 31 supported upon a nut 32 engaging threads provided upon the king pin, the nut being held in place by a crosspin 33 extending through the king pin.

The axle 27 extends through suitable holes formed in the lower end portions of the horn legs, and the axle is provided at one end with an integral head 34 and at the opposite end with a threaded portion 35 engaged by a nut 36. The axle extends through an opening 37 provided in a skein 38. This skein is a member mounted to turn upon the axle eccentrically, being of the general character described in my Patent No. 2,377,232. Tightly held in the bore 37 of the skein, adjacent the ends of the skein, are bushings 39 whose inner surfaces engage the exterior of the axle body. The outer surface of the skein is cylindrical and eccentric to the bore 37. The skein substantially fills the lateral space between the inner surfaces of the horn legs and is adapted to turn freely with reference to the axle.

Associated with the respective end portions of the skein are pancake spiral springs 40, 41 of the general type disclosed in my patent just mentioned, the inner ends of these springs being fixed to the skein, and the outer ends being fixed in this particular case to the respective horn legs, preferably in the manner hereinafter described. In this particular case the body of each spiral spring lies alongside the corresponding horn leg adjacent the inner face of the latter, but at a point adjacent its outer extremity the spring is offset to present a fastening part which is substantially in the plane of the horn leg. The spring 40, for example, shown in detail in Figs. 8 and 9, has an upper offset terminal portion 42 in the plane of the adjacent horn leg connected to the main body of the spring by an inclined portion 43. At the other extremity of the spring the terminal is indicated at 44, and connection of the terminal portion may be made to the corresponding end of the skein in the manner disclosed in the drawings, that is, by providing the terminal portion of the spring with a fixed pin 45, engaging a correspondingly shaped socket 46 in the end portion of the skein. Preferably the end portion of the skein is recessed, as shown at 47, in order to accommodate the pin structure employed for fastening the spring to the skein. The pin 45 may have a flattened enlarged head 48 adapted to lie against the end portion of the skein, said head portion being connected to the terminal portion of the spring in a suitable manner, as by a welding operation, which welding operation provides a body of metal 49 integral with the pin head and with the spring.

The wheel structure 26, previously mentioned, is a duplex structure supported upon and revoluble about the skein 38. This structure includes wheel elements located side by side in close proximity to each other and preferably having the characteristics mentioned previously. The wide wheel element is indicated at 50 and the narrow wheel element at 51. In the form shown these elements consist principally of heavy metal castings having rigid tread portions, the elements having rigid integral spokes connecting the rim with the hub, but this is by way of example only. The element 50 has in its tread portion a V-shaped groove 52 adapted to engage an upstanding V-shaped rail of the type illustrated in my co-pending application Serial No. 556,383, this groove being substantially in the median plane of the wheel structure. To the left of the grooved portion in Fig. 4, the element 50 is shown as provided with a cylindrical floor-engaging surface 53 of substantial area. In this particular case the surface 53 has about the same area as the floor-engaging portion 54 of the wheel element 51. In the particular case shown, the groove 52 has adjacent the respective sides thereof portions 55 and 56 which are sunk or depressed with reference to the aligned floor-engaging surfaces 53, 54. Here the area represented by the grooved portion and its associated depressions represents approximately a third of the tread surface of the wheel structure, and each of the surfaces 53 and 54 takes up approximately another third, but obviously variations may be made in this respect.

Figure 4:
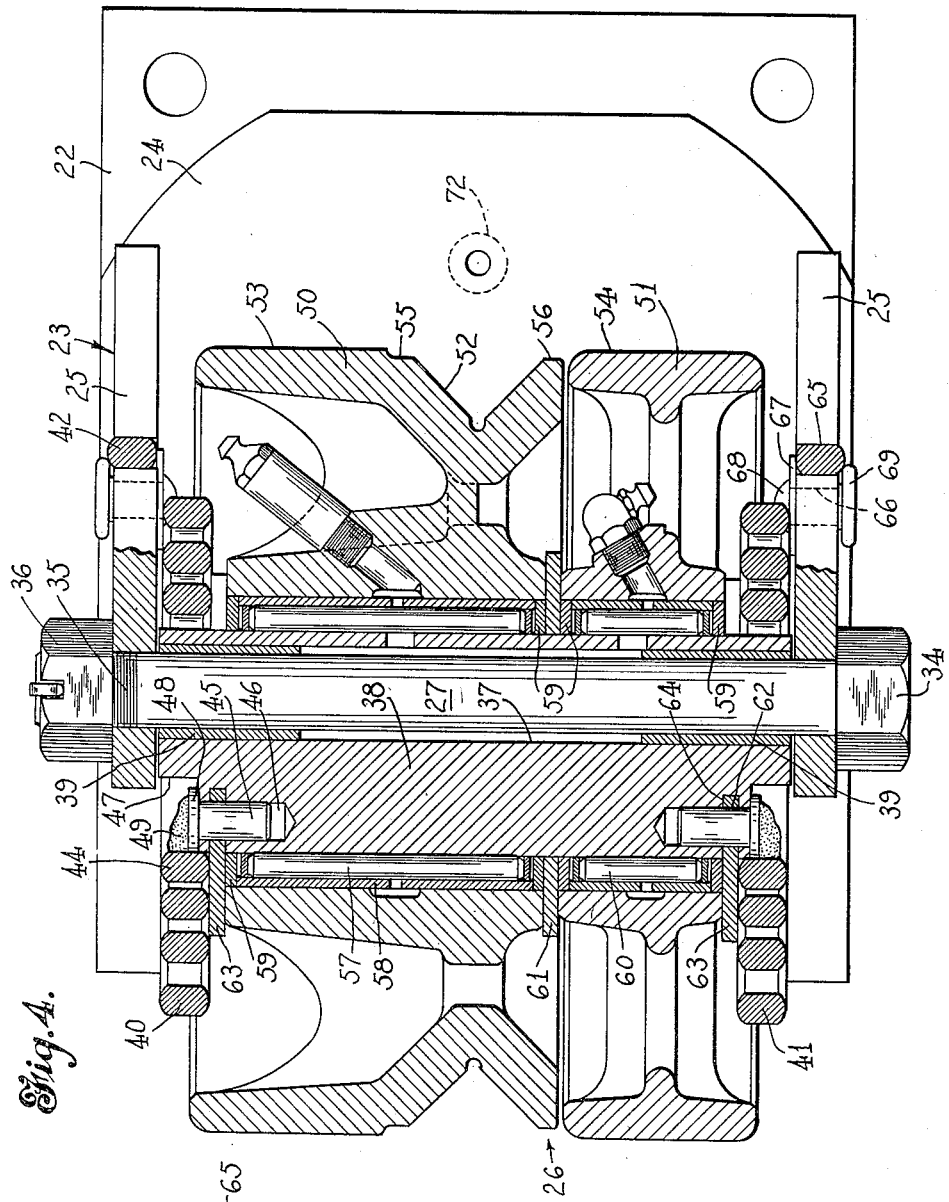
Fig. 4 is an enlarged section on line 4—4 of Fig. 3.
Figure 5:
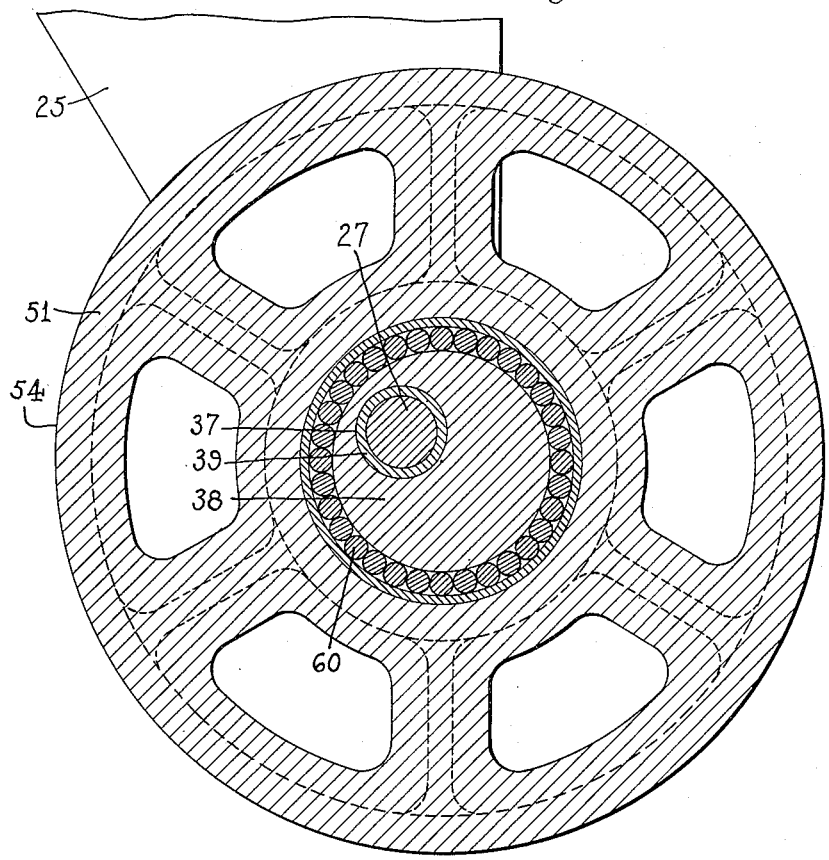
Fig. 5 is an enlarged section on line 5—5 of Fig. 2.
Figure 6:
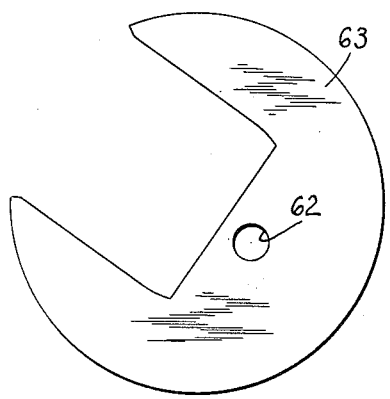
Fig. 6 is a detail of a plate used in the structure.
Figure 7:
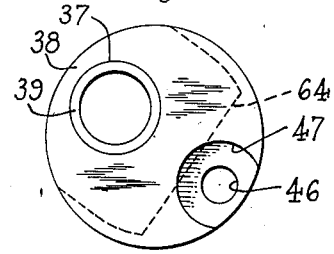
Fig. 7 is a detail end view of the skein.

The wider wheel element 50 is revoluble about the skein by means of anti-friction rollers 57 engaging the external surface of the skein and engaging a liner 58 with which the wheel element is provided. Adjacent the respective sides of the wheel element 50, rings 59 are used to close in the ends of the anti-friction bearing. Similar rings 59 are used in connection with the narrower wheel element 51, whose antifriction rollers 60 are somewhat shorter than the rollers 57. A division washer 61 is inserted between the hub portions of the two wheel elements in order to keep them separated. This washer has a hole whose edge engages the external surface of the skein. The wheel elements, with their respective anti-friction bearings, and the skein, are displaceable axially, but in the final assembly, as shown in Fig. 4, the wheel elements cannot move axially. This is due to the fact that the spring-fastening pins 45 pass through holes 62 provided in plates 63, said plates engaging the outer ends of the wheel element hubs. The plates 63 are received in kerf portions 64 provided in the skein, and the pins 45 hold the plates in these kerf portions so that they cannot be displaced, and so that the spring-held plates confine the duplex wheel structure at the sides of the latter, and, while permitting free rotation of said structure, prevent axial displacement thereof.

Figure 3:
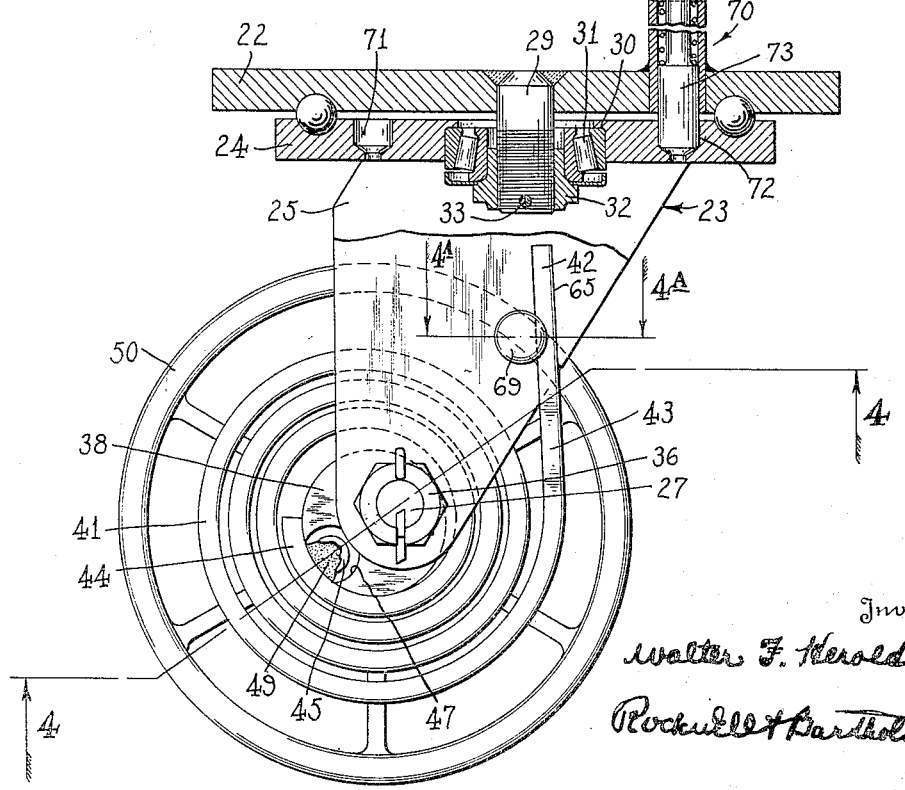
Fig. 3 is an enlarged side elevation of the caster shown in Fig. 1, the upper part being shown in section through the swivel caster.

Each of the straight upper end portions of the spring is preferably engaged in a kerf formed in the corresponding horn leg, and suitably secured in said kerf. The preferred structure is illustrated particularly in Fig. 3 and Fig. 4A, from which it will be seen that the horn leg is provided with a straight kerf 65 extended upwardly from the inclined edge of the horn leg. The terminal portion of the spring fits this kerf closely, and a rivet 66 is inserted into the horn leg at one side of the kerf, said rivet having associated therewith a washer 67. The washer 67 is held in place by a rounded head 68 formed on the rivet after assembly, and the washer overlies the spring at one side of the spring to hold the spring in place. At the other end of the rivet an enlarged head portion 69 overlies the spring at the other side of the spring and holds it in place in the kerf. A shoulder 66$^a$ is provided on the rivet adjacent the head portion 69.

When the vehicle upon which the caster is used requires a rigid support of the wheel structure, so that it is held against swiveling, a suitable locking device, such as shown at 70, may be employed, which has the function of preventing angular movement between the top plate and the upper part of the horn. In the case illustrated, the upper part of the horn is provided at the upper surface with diametrical sockets 71 and 72 adapted to be engaged by a spring-pressed plunger 73 carried by the top plate, and having a manipulating ring 74. In the position shown in Fig. 3, the plunger 73 engages the socket 72 to lock the horn in a definite angular position. In case it is desired to release the lock, the plunger is lifted by pulling upward on the ring 74, and the ring is then turned through ninety degrees so as to engage notches 75 in the plunger-guiding structure to thereby hold the plunger in the inoperative position.

It will be manifest that in assembling each spring in the structure, the upper straight end of the spring can be moved upwardly into the kerf in the horn leg, this being done before the axle is placed in position. After the axle has been placed in position, the skein is held in place, and the skein, acting through the fastening means previously described, holds the inner end of the spring so that there is no appreciable tendency for the outer extremity of the spring to be displaced from its receiving kerf. However, if desired, the outer extremity of the spring can be welded to the horn leg or to the holding rivet structure, or to both.

Figure 8:
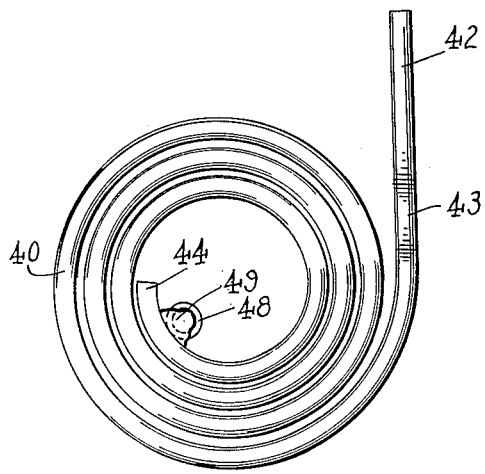
Figs. 8 and 9 are details of one of the cushioning springs, Fig. 8 being a face view and Fig. 9 an edge view.
Figure 9:
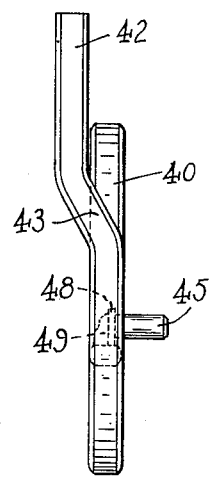

It will be noted from Fig. 4 that each spring has a portion of its body at the inner face of the body in substantial contact with a portion of the corresponding plate 63, a portion of the spring body being located between the plane of the end face of the skein and the plane of the plate 63. It will also be noted from this figure that the diameter of the spring at the inner part thereof is approximately the same as the maximum external diameter of the skein. The spring, aside from the portions 42 and 43, preferably has about three and a half turns, as shown in Fig. 8.

In the operation of the device, it will be understood that, when the wheel structure is engaged with the floor or ground, portions of both wheel elements engage the floor or ground through the tread portions at the respective sides of the wheel structure, the grooved intermediate portion being inactive. When a bump or obstruction is encountered, the wheel structure rises, as described in my Patent No. 2,377,232, against the cushioning effect of the springs, and the springs thereafter restore the center of the wheel structure to the initial position. In case the bump or obstruction is encountered by one only of the wheel elements, the same effect will be produced, the wheel elements being raised against the action of the two springs, inasmuch as both wheel elements revolve about a common skein held by the two springs. The skein is under effective control because of the fact that the ends of the skein are strongly connected to the inner ends of the springs, while the outer ends of the springs are strongly connected to the upper parts of the horn legs. Inasmuch as the two wheel elements can rotate independently of each other when the vehicle is pulled or pushed along the ground, the caster can adapt itself well to the ground surface, and where corners are being turned there is less abrasive action on the wheel than would be the case if a rigid wheel of the same effective width were employed.

Where the vehicle is mounted upon a track, with the groove 52 engaging a V-shaped guide rail, the vehicle is very precisely guided, as described in my Patent No. 2,361,290. In this case the support of the vehicle is effected through the wide wheel element 50 and the skein, which skein extends substantially from one horn leg to the other, and thereby decreases the bending moment on the axle under these conditions. The narrow wheel element is out of operation at this time and obviously neither of the ground-engaging surfaces provides support under these conditions.

The locking device, including the plunger 73 or equivalent member, may be used for locking the caster against swiveling when the vehicle is mounted on a track. It may also be used to convert one or more floor-engaging casters of a vehicle to a non-swiveling structure.

Figure 10:
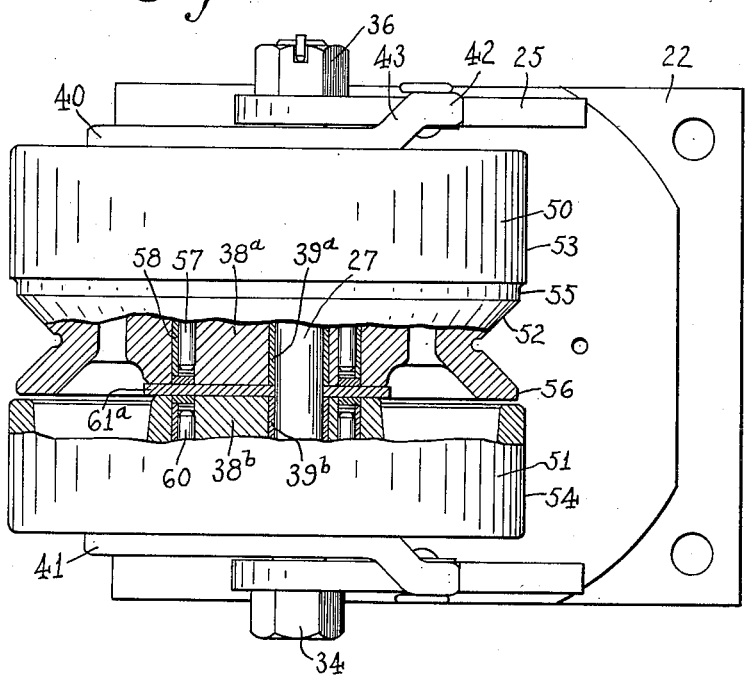
Fig. 10 is a bottom plan view, partly in section, illustrating a caster structure of somewhat modified form.

In the modified form shown in Fig. 10, the structure is substantially the same as previously described, the chief difference being that each wheel element has a separate skein. In Fig. 10, the wide element is shown as having a skein 38$^a$, while the narrow element has a skein 38$^b$. In this case the division washer 61$^a$ extends completely to the body of the axle, separating the two skein members, and also separating bushing members 39$^a$ and 39$^b$ that embrace the axle body and extend at their remote ends into adjacency to the horn legs. In this case, when the vehicle is track mounted the skein of the narrow wheel element is inactive, the weight being borne by the wide wheel element and transmitted through its skein to the axle. When the vehicle is supported on the floor the load is carried by both wheel elements. Independent rotation of the wheel elements is, however, possible, as in the first case. When the wheel structure engages the floor or ground, it is, of course, possible for one element engaging a bump or obstruction to move up and down independently of the other.

It will be apparent that in the forms shown there is provided a caster having a relatively wide wheel structure having at the middle portion a groove for engaging a suitable guide rail, and having at the respective sides of said groove cylindrical floor-engaging surfaces of considerable area. The wheel structure, instead of being made in a single piece, is divided so that the floor-engaging tread at one side of the groove can rotate independently of the floor-engaging tread at the opposite side of the groove. Both of the wheel elements thus provided are, moveover, cushioned in a very effective manner so as to have a knee action, rendering the movement of the vehicle very smooth as it travels over a rough surface. The movement of each wheel element in an upward and downward direction with reference to the axle is provided by mounting on the axle a skein on which the wheel element is revoluble, the skein being turnable on the axle under shock and the upward movement of the wheel center being resisted by a resilient member such as a spiral spring, the inner end of which is fastened to the skein and the outer end of which is fastened to one of the horn legs.

By the invention there is provided an improved caster that enables the truck or other vehicle to be operated upon a guide track, or to be rolled freely over a factory floor without injury thereto, even when a heavy load is supported. An effective cushioned mounting for the wheel structure is provided, and this mounting, as well as the other parts of the caster, are of a rugged, durable and serviceable character.

Only two forms of the invention are shown in the drawing, and it will be understood that these are by way of example only, and that various modifications and changes may be made within the scope of the invention as defined in the claims.

What I claim is:

1. In a caster for industrial trucks having a horn with depending legs and an axle extending across the space between the leg terminals, a wheel structure extending substantially from one horn leg to the other and having at the center a rail-engaging groove and at the respective sides of the groove and immediately contiguous thereto cylindrical floor-contacting surfaces each of the same diameter as the other, said wheel structure being divided asymmetrically so as to have independently rotatable elements one of which is a narrow element having one of said floor-contacting surfaces and the other of which is a wide element having the other floor-contacting surface and also said groove.

2. A caster for industrial trucks having a horn provided with depending legs, an axle extending between the lower end portions of the legs, a wheel structure rotatable about the axle including two independently rotatable immediately contiguous elements one of which is a wide element having a rail-engaging groove at the center of the horn and at one side of said groove a cylindrical floor-engaging surface and the other of which is a narrow element having a cylindrical floor-engaging surface immediately adjacent said groove, and means cushioning said elements for up-and-down movement with respect to the axle, said cushioning means including an eccentric skein structure turning on the axle and also including cushioning springs connected to said skein structure adjacent the respective ends of the skein structure.

3. A caster for industrial trucks having a horn provided with depending legs, an axle extending between the lower end portions of the legs, a wheel structure rotatable about the axle including two independently rotatable immediately contiguous elements one of which is a wide element having a rail-engaging groove at the center of the horn and at one side of said groove a cylindrical floor-engaging surface and the other of which is a narrow element having a cylindrical floor-engaging surface immediately adjacent said groove, and means cushioning said elements for up-and-down movement with respect to the axle, said cushiong means including an eccentric skein structure turning on the axle and also including cushioning springs connected to said skein structure adjacent the respective ends of the skein structure, said skein structure consisting of a single member common to both of the rotatable elements.

4. A caster for industrial trucks having a horn, an axle carried by the horn, a wheel structure of substantial width mounted rotatably about the axle and extending substantially from one side of the horn to the other, said wheel structure comprising independently rotatable elements one of which is a wide element having a rail-engaging groove at the middle of the axle and at one side of said groove a floor-contacting surface, the other element being a narrow element having a floor-contacting surface at one side of said groove immediately contiguous to said groove.

5. In a duplex wheel structure, the combination of a forked support and wheels mounted in said support for cushioned up-and-down movement, said wheels having supporting axle portions arranged side by side and in alignment with each other, a skein common to the wheels supporting them for rotation and mounted on the axle to turn on the axle on an axis eccentric to the skein, and springs of spiral form adjacent the ends of the skein connected at their inner ends to the skein and at their outer ends to the support.

6. Means for supporting a vehicle or other structure movable on and over an uneven supporting surface, comprising a wheel to support the structure from beneath, an axle, an axle support comprising a horn having legs supporting the axle from the respective ends, a skein mounted on the axle for turning on an axis eccentric to the skein and about which the wheel is revoluble, a spiral spring at one side of the wheel having its inner end fastened to the skein and having a substantially straight outer end entered into a kerf in one of the horn legs extending inwardly from an edge of the leg, and a member secured to said horn leg overlying at opposite sides the portion of the spring engaged in said kerf in order to prevent displacement of the spring.

7. Means for supporting a vehicle or other structure, comprising a wheel to support the structure from beneath, an axle, an axle support comprising a horn having legs supporting the axle from the respective ends, a skein mounted on the axle for turning on an axis eccentric to the skein and about which the wheel is revoluble, and a spiral spring at one side of the wheel having its inner end fastened to the skein, said spring having a substantially straight outer end portion integral with the spring body and in an offset plane from the spring body engaging one of the horn legs and fastened thereto.

8. Means for supporting a vehicle or other structure movable on and over an uneven supporting surface, comprising a wheel to support the structure on the uneven surface, an axle, an axle support, a skein mounted on the axle for turning on an axis eccentric to the skein and about which said wheel is revoluble, said wheel being movable along said skein, a spiral spring connected at its inner end to the skein and at its outer end to a point which is in fixed relation to the axle support, and a plate held in position by the inner end portion of said spring which limits the movement of the wheel axially of the skein.

9. Means for supporting a vehicle or other structure movable on and over an uneven supporting surface, comprising a wheel, an axle, an axle support, a skein mounted on the axle for turning on an axis eccentric to the skein and about which said wheel is revoluble, and a spiral spring having its outer end in fixed relation to the axle support and having its inner end connected to an end of the skein, the inner end portion of the spring holding in place axially of the skein a plate overlying the wheel at the side of the latter, said plate holding the wheel against axial displacement.

10. Means for supporting a vehicle or other structure movable on and over an uneven supporting surface, comprising a wheel having a hub, an axle, an axle support, a skein mounted on the axle for turning on an axis eccentric to the skein and about which the wheel hub is revoluble, a spiral spring connected at its outer end to a point which is in fixed relation to the axle support, a laterally extending pin carried by the inner end portion of the spring entering a socket in the end of the skein, and a positioning plate overlying the wheel hub at one end of the latter engaging a groove in the skein and held against displacement by said pin.

11. Means for supporting a vehicle or other structure movable on and over an uneven supporting surface, comprising a horn having depending legs, an axle extending between the terminals of said legs, a skein structure mounted on the axle for turning on an axis eccentric to the skein structure, wheels mounted side by side on the skein structure and adapted to turn about the axis of the skein structure, resilient cushioning spiral spring members at the sides of the wheels which are remote from each other connected to the horn legs and to the ends of the skein structure, and means connected to said resilient cushioning members confining the wheels and preventing their endwise displacement.

12. Means for supporting a vehicle or other structure movable on and over an uneven supporting surface, comprising a horn having depending legs, an axle extending between the terminals of said legs, a skein structure mounted on the axle for turning on an axis eccentric to the skein structure, wheels having hubs mounted side by side on the skein structure and adapted to turn about the axis of the skein structure, resilient cushioning members at the sides of the wheels which are remote from each other connected to the horn legs and to the ends of the skein structure, and means connected to said resilient cushioning members confining the wheels and preventing their endwise displacement, said last-named means including positioning plates engaged with grooves in the end portions of the skein structure and having portions overlying the hub portions of the wheels.

13. In a duplex wheel structure, the combination of a forked support and wheels mounted in said support for cushioned up-and-down movement, said wheels having supporting axle portions arranged side by side and in alignment with each other, said wheels being arranged side by side with one in immediate proximity to the other, one of said wheels having a wide tread surface and the other a narrow tread surface, skeins for the respective wheels supporting them for rotation and mounted on the axle portions to turn eccentrically to the axle portions, and springs of spiral form at the outer sides of the wheels connected at their outer ends to said support and at their inner ends to the respective skeins.

14. A caster for industrial trucks having a horn with legs at the sides separated from each other by an open intervening space, an axle supported in the ends of said legs and extending across the space between the leg ends, two wheels rotatable about said axle and immediately contiguous to each other although independently rotatable and substantially filling the space between the horn legs, one of said wheels being substantially wider than the other, said wheels each having a substantially cylindrical floor-engaging surface of substantially the same area as that of the other wheel, the wider wheel having a V-shaped peripheral groove creating a valley that lies between the cylindrical portions of the wheels and is substantially in the median plane of the horn and immediately adjacent the cylindrical portion of the other wheel, an eccentric skein structure interposed between said wheels and the axle adapted to raise and lower the wheels as said skein structure is turned relatively to the axle, and spiral spring members adjacent the remote sides of said wheels each connected at one end to the skein structure and at the other end to the corresponding horn leg.

15. A caster for industrial trucks having a horn provided with depending legs, an axle fixed to the leg terminals and extending across the space between the legs, a wheel structure rotatably mounted about the axle and extending substantially across the space between the horn legs, said wheel structure comprising a wheel having a substantially cylindrical floor-engaging surface at one side and a V-shaped groove formation substantially in the median plane of the horn and also comprising an independently rotatable narrower wheel immediately adjacent said groove formation having a substantially cylindrical floor-engaging surface, an eccentric skein interposed between said wheels and said axle adapted to raise and lower the wheels as said skein structure is turned relatively to the axle, and spiral spring members at the remote sides of the wheels each connected at one end to the skein structure and at the other end to the corresponding horn leg.

WALTER F. HEROLD.

REFERENCES CITED

The following references are of record in the file of this patent:

UNITED STATES PATENTS

| Number | Name | Date |
| --- | --- | --- |
| 235,785 | Krajewski | Dec. 21, 1880 |
| 270,605 | Paepke | Jan. 16, 1883 |
| 1,431,401 | Hupp | Oct. 10, 1922 |
| 1,642,504 | Miller | Sept. 13, 1927 |
| 1,730,875 | Brown | Oct. 8, 1929 |
| 2,135,307 | Keator | Nov. 1, 1938 |
| 2,242,454 | Cochran | May 20, 1941 |
| 2,361,268 | Cochran | Oct. 24, 1944 |
| 2,377,232 | Herold | May 29, 1945 |
| 2,443,900 | Evans | June 22, 1948 |

FOREIGN PATENTS

| Number | Country | Date |
| --- | --- | --- |
| 2,669 | Great Britain | Feb. 3, 1906 |